United States Patent [19]
Pefferman

[11] 3,742,612
[45] July 3, 1973

[54] TREATMENT OF TITANIUM TETRACHLORIDE DRYER RESIDUE

[75] Inventor: William C. Pefferman, New Martinsville, W. Va.

[73] Assignee: PPG Industries, Inc., Pittsburgh, Pa.

[22] Filed: June 28, 1972

[21] Appl. No.: 266,944

Related U.S. Application Data
[63] Continuation-in-part of Ser. No. 130,331, April 1, 1971, Pat. No. 3,696,519.

[52] U.S. Cl. .................................... 34/9, 423/492
[51] Int. Cl. ........................................... C01g 23/00
[58] Field of Search .................. 23/87 T, 87 TP; 34/9, 19; 423/492

[56] References Cited
UNITED STATES PATENTS

| | | | |
|---|---|---|---|
| 3,359,065 | 12/1967 | Zirngibl et al. | 423/492 |
| 3,009,541 | 11/1961 | Mas et al. | 55/82 X |
| 2,870,869 | 1/1959 | Mahler | 55/82 X |
| 2,857,242 | 10/1958 | Schossberger | 34/9 X |
| 2,792,077 | 5/1957 | Mas et al. | 423/79 X |
| 2,396,458 | 3/1946 | Cole et al. | 423/492 X |

Primary Examiner—Meyer Perlin
Assistant Examiner—William C. Anderson
Attorney—Russell A. Eberly

[57] ABSTRACT

The production of titanium tetrachloride by chlorination of titaniferous ores is described. Fuming of titanium tetrachloride dryer residue is inhibited by adding alkaline earth metal hydroxide to the dryer means before exposing the residue to air.

8 Claims, 1 Drawing Figure

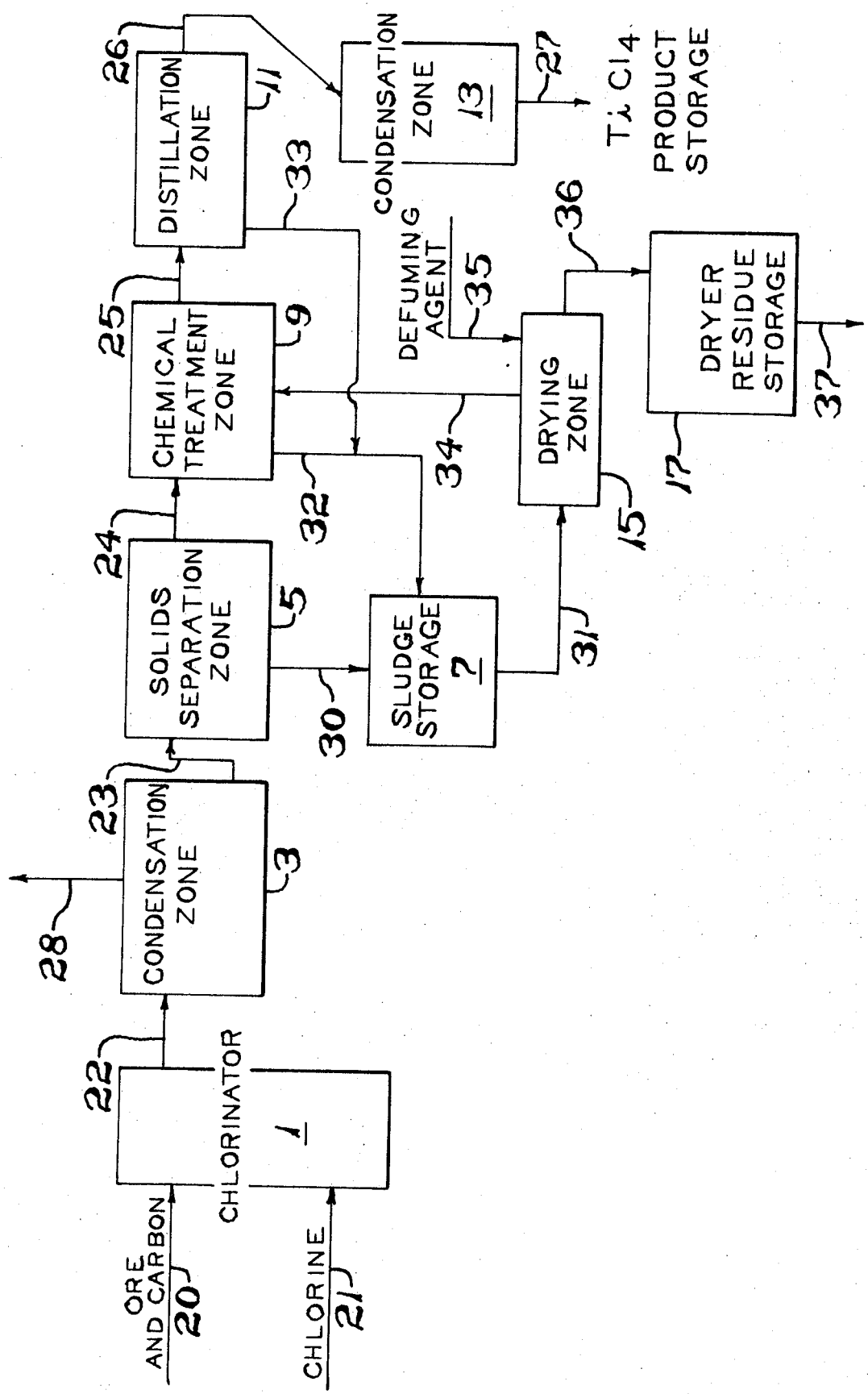

TREATMENT OF TITANIUM TETRACHLORIDE DRYER RESIDUE

CROSS-REFERENCE TO RELATED APPLICATIONS

This application is a continuation-in-part application of copending application, U. S. Ser. No. 130,331, filed Apr. 1, 1971 in the name of William C. Pefferman for TREATMENT OF TITANIUM TETRACHLORIDE DRYER RESIDUE and, now U.S. Pat. No. 3,696,519.

BACKGROUND OF THE INVENTION

Titanium tetrachloride is typically produced commercially by the chlorination of titanium-bearing materials, such as ilmenite or rutile, in the presence of a carbonaceous reductant, e.g., coke, in static or fluosolids bed type reactors. The vaporous product effluent from the reactor comprises, in addition to titanium tetrachloride, carbon monoxide, carbon dioxide, chlorine, hydrogen chloride, phosgene and chlorides and oxychlorides of the metallic and non-metallic (hereinafter referred to collectively as metal chlorides) constituents present in the ore and carbonaceous material. This vaporous product effluent is cooled to below the dew point temperature of titanium tetrachloride to produce an impure titanium tetrachloride condensate. This material contains, in addition to liquid metal chlorides, solid metal chlorides, most notably the iron chlorides, solid metal oxides, such as silica and zirconia, and other entrained unreacted solids carried over from the reactor in the vaporous product effluent, e.g., the titanium-bearing material and carbonaceous reductant.

Before subjecting the aforesaid impure titanium tetrachloride condensate to purification, the solids contained in the condensate are separated substantially from the impure condensate. Solids separation can be conducted by one or more conventional vaporization and/or settling operations or any other conventional technique utilized for separating solids from liquids, e.g., cyclones, centrifuges, etc. Typically, such solids are removed as a slurry, the liquid portion of which is principally titanium tetrachloride. Some of the aforesaid solids can be separated from the vaporous product effluent from the reactor while said effluent is still in the vapor state by passing the effluent through, for example, a cyclone; and/or by partial cooling to selectively remove metal chlorides, e.g., ferric chlorides, at above the dew point temperature of $TiCl_4$. The substantially solids-free (less than about one weight percent) liquid material resulting from the aforesaid solids separation step(s) is referred to commonly as crude titanium tetrachloride.

Some of the metallic chlorides and oxychlorides produced in the chlorinator, most notably, the vanadium chlorides, have boiling points close to titanium tetrachloride and are not readily eliminated therefrom by fractional distillation. It has, therefore, become customary to treat substantially solids-free, crude titanium tetrachloride chemically prior to distillation to produce a titanium tetrachloride of higher purity. Following chemical treatment, titanium tetrachloride is distilled from the treated crude $TiCl_4$. The liquid-solid residue from the aforementioned chemical treatment is commonly referred to as "purification sludge" because of its consistency. Since the sludge has a considerable amount of recoverable titanium tetrachloride, the sludge is heated to dryness, and the titanium tetrachloride vapor recovered from said sludge is recycled back into the process at any convenient point, e.g., the chemical treatment zone or the reactor product effluent condensation zone. Often, the solids slurry from the aforementioned solids separation step is combined with the residue from the chemical treatment step before drying. As used herein, the term "purification sludge" is intended to mean and include one or more of the residuums produced during purification (physical and/or chemical) of impure and crude titanium tetrachloride produced by chlorination of a titanium-bearing material, e.g., a titaniferous ore.

The dusty, powdery, substantially dry residue obtained from the drying of the aforesaid purification sludge is commonly referred to as "titanium tetrachloride dryer residue." Typically, the dryer residue is discarded as a waste product.

The dryer means used to dry the purification sludge is closed to the atmosphere and when the dryer residue is discharged from such closed dryer means, it is exposed to the atmosphere (air). Typically, the dryer residue withdrawn from the dryer is still relatively hot, i.e., at substantially drying temperatures (about 400° F.), and while the residue is cooling in preparation for its subsequent disposal, white and brown fumes are evolved. It is believed that these fumes are caused by the evolution of residual quantities of titanium tetrachloride, iron chlorides and hydrogen chloride remaining in the hot residue and/or their reaction with the moisture in the air. Although drying is conducted in a manner such that substantially all of the residual vaporizable metal chlorides and hydrogen chloride are removed from the residue, e.g., by tumbling the residue and extending the drying cycle, it has been found that despite such steps, a small amount of vaporizable metal chloride and hydrogen chloride remains entrapped in the residue. The fumes evolved from the dryer residue upon exposure to the air in the atmosphere present a health hazard to individuals working in the area and a potential air pollution problem.

BRIEF SUMMARY OF THE INVENTION

It has now been discovered that the fumes emitted upon exposure to the atmosphere of titanium tetrachloride dryer residue discharged from the dryer means can be significantly inhibited by introducing an inhibiting amount of alkaline earth metal hydroxide into the dryer means before exposing the dryer residue to the ambient air, e.g., removing the dryer residue from the dryer means or opening the dryer means.

BRIEF DESCRIPTION OF THE DRAWING

The single FIGURE is an abbreviated block flow diagram of a typical process for producing titanium tetrachloride by chlorination of titaniferous ore, including the treatment of titanium tetrachloride dryer residue in accordance with the process of the present invention.

DETAILED DESCRIPTION

The present invention will be better understood by referring to the following description and the abbreviated block diagram flow sheet of the attached FIGURE wherein a particular embodiment of the present invention is depicted.

Titanium tetrachloride is commonly produced by chlorinating a titaniferous ore, such as ilmenite, rutile, arizonite, leucoxene and titanium slags and concentrates in the presence of carbon or a carbonaceous material, e.g., coke, at temperatures of from 500° C. to about 1,400° C., more usually from 800° C. to 1,100° C. The chlorination is typically conducted in a static bed or a fluosolids reactor. Referring now to the accompanying FIGURE, ore, carbon and chlorine are introduced into chlorinator 1, as shown by lines 20 and 21, and the vaporous product effluent produced by the chlorination of the metal values contained in the titaniferous ore and carbonaceous reductant removed from the chlorinator as shown by line 22.

The carbonaceous reductant utilized in the aforesaid chlorination reaction can be any carbon-containing reducing agent that is substantially hydrogen-free since the presence of hydrogen in the chlorinator results in the formation of hydrogen chloride, which both increases the consumption of chlorine and causes corrosion difficulties within the chlorinator and within downstream processing equipment. Typically, coke or carbon monoxide is employed; however, other carbon-containing reducing agents, such as graphite, charcoal, etc., can be employed. The amount of carbonaceous reductant mixed with the titaniferous ore will vary; however, typically, the amount ranges from about 10 to about 50 percent by weight, usually from about 10 to about 30 percent by weight, of the total composition of the feed charged to the chlorinator.

The product effluent removed from chlorinator 1, as shown by line 22, typically comprises vaporous titanium tetrachloride and metal and non-metal chlorides and oxychlorides of the metal and non-metal values contained in the titaniferous ore and carbonaceous reductant feeds that are vaporizable at the chorination temperatures and pressures used. Hereinafter, the aforesaid metal and non-metal chlorides and oxychlorides will be referred to collectively as "metal chlorides." Carbon dioxide, carbon monoxide, chlorine, phosgene and entrained solids, e.g., ore, carbon, silica and zirconia, can also be present in the product effluent. Typical of the metal chloride components (other than titanium) present in the product effluent are the chlorides of iron, silicon, tin, aluminum, vanadium and chromium.

The product effluent stream removed from chlorinator 1 is forwarded to condensation zone 3, wherein it is cooled to below the dew point temperature of titanium tetrachloride to produce an impure titanium tetrachloride condensate. The uncondensed components of the product effluent stream, principally carbon dioxide, carbon monoxide and trace amounts of chlorine and uncondensed metal chlorides, are removed from the condensation zone, as shown by line 28, and forward to a scrubbing zone (not shown) to remove noxious components therefrom before being burned. Typically, the scrubbing zone comprises a conventional water or caustic scrubber. Following scrubbing, the resulting gaseous stream, usually referred to as waste gas, is normally diluted with air and forwarded to a vent stack (not shown) whereat the combustible components thereof, i.e., principally carbon monoxide, are burned. Alternatively, the waste gas can be forwarded to a $CO/CO_2$ recovery unit.

The impure titanium tetrachloride condensate produced in condensation zone 3 is a slurry of entrained solids and solid metal chlorides, most notably, iron chlorides, in the normally liquid metal chlorides, principally titanium tetrachloride. Typically, most of the aforementioned solid components are removed from the impure titanium tetrachloride condensate before subjecting the liquid titanium tetrachloride to purification by chemical treatment and distillation. The separation of normally solid components form the normally liquid components of the forward flow slurry, represented by line 23, can be accomplished readily in a solids separation zone 5 that can be either settling tank or heated tank in order to vaporize and thereby separate the liquid components of the condensate from the solids contained therein.

Substantially all of the solids in the impure $TiCl_4$ condensate are separated in solids separation zone 5 so that a crude titanium tetrachloride stream containing less than about 1 weight percent solids is produced. The solids slurry or sludge, as it is often called, that accumulates in solids separation zone 5, is removed from that zone, as shown by line 30, into a sludge storage vessel 7. The percent solids in the sludge removed from separation zone 5 should be as high as possible and usually is from about 15 to about 30 weight percent, more typically from about 18 to about 22 weight percent, solids. The liquid portion of the solids slurry is principally titanium tetrachloride.

As noted above, metal chlorides other than titanium tetrachloride are present in the crude titanium tetrachloride removed from solids separation zone 5 as a forward flow stream (line 24). Vanadium chlorides are not separated easily from titanium tetrachloride by distillation because of the proximity of their boiling points to titanium tetrachloride. The vanadium chlorides can be present in the form of vanadium tetrachlorides and/or vanadium oxychlorides, and can be present in amounts of from about 0.10 to about 1.0 weight percent vanadium, calculated as $V_2O_5$, based on the weight of titanium tetrachloride.

It is customary to treat crude titanium tetrachloride with chemical reagents, most notably, organic purifying agents, that have an affinity for vanadium in order to tie up the vanadium as a high-boiling chemical complex. The chemical purifying agents disclosed in the art are well known in this field. Among the purifying agents disclosed in the art, there can be mentioned: sulfur, hydrogen sulfide, chlorinated hydrocarbons, metals, such as copper and powdered iron, either alone or in combination with alkaline agents, metal hydrides, and other organic treating agents, such as animal oil, e.g., talpa oil, vegetable oils, e.g., tall oil, waxes, fatty acids, fatty alcohols, soaps, petroleum fractions, such as lubricating oil, mineral oil and heavy residual fractions, such as Bunker "C" oil, and predominantly hydrocarbon polymers, such as polyethylene and polypropylene. Typically, from about 0.03 to about 10 percent by weight of purifying agent, based on the amount of titanium tetrachloride treated, having affinity for vanadium, is used.

As shown in the drawing, crude titanium tetrachloride from solids separation zone 5 is forwarded to chemical treatment zone 9, as shown by line 24. There, purifying agent having affinity for vanadium is intimately mixed with the substantially solids-free crude titanium tetrachloride. Chemical treatment zone 9 is normally maintained near the boiling point of titanium tetrachloride, i.e., between 270° F. and 300° F., so that titanium tetrachloride vapors are distilled from the liquid within zone 9, and forwarded to distillation zone 11, as shown by line 25. The overhead from distillation zone 11 is forwarded to condensation zone 13, as shown by line 26, from which substantially vanadium-free titanium tetrachloride is recovered. Such material can be forwarded to titanium tetrachloride product storage, as shown by line 27, or, can be subjected to further purification by additional distillation steps.

As titanium tetrachloride is removed from chemical treatment zone 9 (batchwise or continuously), the solids level in the liquid in the chemical treatment zone rises. The solids within the zone comprise principally the high-boiling complex formed by the interaction of the purifying agent and vanadium values within the crude titanium tetrachloride, and the solids, if any, carried over from solids separation zone 5. The level of solids in the chemical treatment zone 9 is limited to a level and/or temperature at which the contents of the zone remain flowable or pumpable, i.e., the material in the treatment zone has a tendency to congeal in the form of a pasty-type material when the solids level becomes too high. The exact solids level at which the contents of treatment zone 9 congeal and become nonflowable is a function of temperature, viscosity and chemical composition. Since the temperature is relatively constant and the chemical composition varies moderately as the ore is chlorinated, it is customary to stay at a solids level below the maximum permitted in order to insure that fluctuations in the viscosity produced as a result of the change in chemical composition of the liquid in the treatment zone do not cause congealing accidentally. The level of solids in treatment zone 9 normally ranges from about 13 to about 18 percent.

When the solids level of the contents in chemical treatment zone 9 approaches a level above which the viscosity of the contents can become too high for pumping, the treatment zone is partially purged. Typically, from one-half to four-fifths of the contents of the treatment zone is removed therefrom and the remainder diluted with crude titanium tetrachloride from solids separation zone 5. The material purged from chemical treatment zone 9 is commonly known as purification sludge, because of its consistency, and contains a significant quantity of recoverable $TiCl_4$. This material is forwarded to sludge storage 7, as shown by line 32, where it is admixed with the solids slurry charged to sludge storage 7 from solids separation zone 5. In addition, bottoms from distillation zone 11 are also removed therefrom and, if desired, can also be forwarded to sludge storage 7, as shown by lines 33 and 32. For purposes of brevity, the blend of materials in sludge storage 7 will be referred to as "purification sludge" since it results from one or more purification steps performed on the reactor product effluent. It should be noted that substantially all waste streams containing recoverable titanium tetrachloride produced in the process are recycled to the sludge storage 7 for recapture of titanium tetrachloride. However, the term "purification sludge," as used herein, is not to be limited to the blend of all of such streams, since it can comprise one or more, but not all, of said streams.

Since the liquid portion of the purification sludge is principally titanium tetrachloride, the sludge is forwarded to drying zone 15, as shown by line 31, where the sludge is heated to dryness.

The drying zone can comprise one or more dryer means. Such dryer means can be conventional dryers (directly or indirectly heated) used for drying titanium tetrachloride sludge or any other drying means by the operation of which vaporizable metal halides are removed from the sludge leaving a substantially dry solid residue. Drying can be accomplished in a continuous or batch manner. As examples of direct heated dryers, there can be mentioned rotary dryers, spray dryers, as shown in U. S. Pat. No. 3,009,541, pneumatic conveying dryers, through circulation dryers, and compartment dryers. As examples of indirectly heated dryers, there can be mentioned screw conveyor dryers, steam tube rotary dryers and vacuum rotary dryers. Thus, as used herein, the term "dryer residue" is intended to mean and include the substantially dry solids obtained by the removal of vaporizable metal chlorides, e.g., $TiCl_4$, from the $TiCl_4$ purification sludge (as defined herein) regardless of the particular dryer means for removing said metal chlorides from said sludge.

The substantially dry solid dryer residue is removed from drying zone 15, as shown by line 36, to dryer residue storage 17, which is typically open to the atmosphere. Eventually, the dryer residue is removed from storage 17, as shown by line 37, and discarded. Metal chloride vapors removed during drying from drying zone 15, as shown by line 34, are condensed in condensers (not shown) and forwarded to chemical treatment zone 9. As discussed hereinabove, such condensate can be forwarded or recycled to any convenient point in the process.

In accordance with the process of the present invention, a defuming agent is added to drying zone 15, as shown by line 35. Defuming agents, i.e., the agent that inhibits and/or reduces the formation of substantial amounts of white and brown smoke upon exposure of dryer residue to the atmosphere, useful in the practice of the present process are alkaline earth metal hydroxides. The term "alkaline earth metal hydroxide" is intended to include both the hydrated (containing water of hydration) and unhydrated forms of the aforementioned hydroxides. Of the more readily available hydroxides, there can be mentioned the hydroxides of calcium, barium, magnesium and strontium. More specifically, there are contemplated the following alkaline earth metal hydroxides, as represented by the following chemical formulae: $Ca(OH)_2$ (slaked lime), $Mg(OH)_2$, $Ba(OH)_2$, $Ba(OH)_2 \cdot H_2O$, $Ba(OH)_2 \cdot 5H_2O$, $Ba(OH)_2 \cdot 8H_2O$, $Sr(OH)_2$ and $Sr(OH)_2 \cdot 8H_2O$. Mixtures of alkaline earth metal hydroxides are also contemplated. Calcium hydroxide, e.g., slaked lime, is a preferred defuming agent.

The amount of defuming agent (alkaline earth metal hydroxide) introduced into the dryer means is that amount that is sufficient to inhibit or reduce the formation of substantial quantities of smoke (fumes) upon exposure of the dryer discharge to the atmosphere, i.e., an inhibiting amount. Typically, from about 1 to about 40 weight percent of the above-mentioned alkaline earth metal hydroxide defuming agent, based on the amount of dryer residue, is used. While more than 40 weight percent of defuming agent can be used, such amounts are not economically preferred. Preferably, from about 5 to about 35 weight percent of alkaline earth metal hydroxide defuming agent is used. In other terms, from about 0.2 to about 8 weight percent of the alkaline earth metal hydroxide, based on the initial charge of purification sludge to the dryer means, is used. Preferably, from about 0.25 to about 7 weight percent, basis the purification sludge, is used.

While the aforementioned alkaline earth metal hydroxide defuming agent can be introduced into the dryer means at any time during the drying cycle, it is preferred that it be added after substantially all of the vaporizable titanium tetrachloride has been evaporated from the sludge material. This preferred embodiment allows greater utilization of the metal hydroxide as a defuming agent than if it were to be added at the beginning of the drying cycle. Most preferably, the defuming agent is added from about ½ to 2 hours before discharging dryer residue from the drying means. During that time, the metal carbonate is intimately contacted with the dryer residue by providing agitator means, such as an agitator, scraper or baffles, within the dryer. Thus, the dryer residue is tumbled and mixed intimately with the alkaline earth metal hydroxide defuming agent for a period of time sufficient ot permit the metal hydroxide to interact with the dried residue and perform its function, i.e., minimize fuming of the residue. Agitation during addition of the defuming agent prevents the buildup of substantial pressure within the dryer means as a result of chemical reactions that may occur in the dryer means as a result of such addition. Although not wishing to be bound by any particular theory, it is speculated that the defuming agent substantially neutralizes the residual amounts of titanium tetrahchloride, iron chloride and hydrogen chloride remaining in the dryer residue.

The alkaline earth metal hydroxide defuming agent can be introduced into the dryer in any convenient manner, such as by pouring dry, solid metal hydroxide into the dryer through a suitable port. While the hydroxide can be added also as an aqueous solution or slurry, such embodiments only add water to the dryer and increase the heat load of the dryer, thereby prolonging the drying cycle and, therefore, is not considered economically practical. The alkaline earth metal hydroxide is added preferably in dry form, i.e., powdered or granular. Preferably, a granular metal hydroxide is used because such form avoids the generation of dust which normally accompanies the use of a powdery material.

The present process is more particularly described in the following examples which are intended as illustrative only since numerous modifications and variations therein will be apparent to one skilled in the art.

EXAMPLE I

Titanium tetrachloride was produced by the chlorination of rutile ore in a fluid bed type reactor. The effluent from the chlorinator was cooled to below the dew point of titanium tetrachloride to produce an impure TiCl₄ condensate. Solids contained in the impure TiCl₄ condensate were separated therefrom as a slurry and the resulting crude TiCl₄ treated with about 0.1 weight percent of talpa oil. Sludge resulting from the aforesaid chemical treatment was combined with the aforementioned solids slurry and this material dried in an agitated batch type closed horizontal dryer. Before the scheduled discharge of dryer residue from the dryer, about 35 weight percent of slaked lime (calcium hydroxide), based on the weight of the dryer residue, was introduced into the dryer over a period of 82 minutes. Agitation of the residue was continued during addition of the slaked lime. The dryer vent temperature increased from 155° F. to 185° F. during addition of the slaked lime and then began to subside. The contents of the dryer were discharged into dryer residue storage bins that were open to the atmosphere. The residue was completely fumeless, i.e., no white and brown fumes were observed to emanate from the residue, as would be the case with untreated residue. In addition, the residue was observed to be much more free-flowing than untreated residue.

EXAMPLE II

The procedure of Example I is repeated successively with the hydroxides of magnesium, strontium and barium. Results similar to those observed in Example I are observed.

EXAMPLE III

The procedure of Example I was repeated except that 1.25 weight percent of slaked lime based on the weight of the dryer residue was used. A significant reduction in evolution of fumes from the dryer residue was observed, as compared to untreated dryer residue.

The results of Examples I – III show that the addition of alkaline earth metal hydroxides to titanium tetrachloride dryer residue significantly reduces the amount of fuming of said dryer residue upon its exposure to the atmosphere.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

I claim:

1. In the process of drying titanium tetrachloride purification sludge in closed dryer means wherein the resulting dryer residue is exposed to the atmosphere, the improvement which comprises inhibiting the formation of substantial amounts of fumes upon exposure of said dryer residue to the atmosphere by mixing with said dryer residue an inhibiting amount of alkaline earth metal hydroxide before such exposure.

2. The process of claim 1 wherein the alkaline earth metal hydroxide is slaked lime.

3. The process of claim 1 herein the alkaline earth metal hydroxide is the hydroxide of barium, calcium, magnesium or strontium.

4. The process of claim 1 wherein the amount of alkaline earth metal hydroxide used is from about 0.2 to about 8 weight percent, based on the amount of purification sludge charged to the dryer means.

5. The process of claim 1 wherein the amount of alkaline earth metal hydroxide used is from about 1 to about 40 weight percent, based on the amount of dryer residue.

6. The process of claim 1 wherein the alkaline earth metal hydroxide is introduced into said closed dryer means.

7. The process of claim 6, wherein the alkaline earth metal hydroxide is introduced into said dryer means from about ½ to about 2 hours before the dryer residue is exposed to the atmosphere.

8. In the process of drying titanium tetrachloride purification sludge in closed dryer means wherein the resulting dryer residue is exposed to the atmosphere, the improvement which comprises inhibiting the formation of substantial amounts of fumes upon exposure of said dryer residue to the atmosphere by introducing to said dryer means from about 0.2 to about 8 weight percent of calcium hydroxide, based on the amount of purification sludge charged to the dryer means, before such exposure.

* * * * *